US011831802B2

(12) United States Patent
Shoushan et al.

(10) Patent No.: US 11,831,802 B2
(45) Date of Patent: Nov. 28, 2023

(54) SYSTEMS AND METHODS FOR HANDLING A TELEPHONY COMMUNICATION SETUP REQUEST

(71) Applicant: VONAGE BUSINESS INC., Atlanta, GA (US)

(72) Inventors: Roy Ben Shoushan, Rishon Lezion (IL); Assaf Passal, Nechalim (IL)

(73) Assignee: Vonage Business Inc., Holmdel, NJ (US)

( * ) Notice: Subject to any disclaimer, the term of this patent is extended or adjusted under 35 U.S.C. 154(b) by 0 days.

(21) Appl. No.: 17/889,964

(22) Filed: Aug. 17, 2022

(65) Prior Publication Data

US 2022/0394125 A1    Dec. 8, 2022

Related U.S. Application Data

(63) Continuation of application No. 17/101,333, filed on Nov. 23, 2020, now Pat. No. 11,431,839.

(51) Int. Cl.
*H04M 3/22* (2006.01)
*H04M 3/42* (2006.01)
*H04M 7/00* (2006.01)

(52) U.S. Cl.
CPC ..... *H04M 3/2218* (2013.01); *H04M 3/42059* (2013.01); *H04M 3/42102* (2013.01); *H04M 7/006* (2013.01)

(58) Field of Classification Search
CPC ........... H04M 3/2218; H04M 3/42059; H04M 3/42102; H04M 3/4209
USPC ....................................................... 370/259
See application file for complete search history.

(56) References Cited

U.S. PATENT DOCUMENTS

| 2004/0249650 | A1 | 12/2004 | Freedman et al. |
| 2009/0274284 | A1 | 11/2009 | Arsenault et al. |
| 2010/0330960 | A1 | 12/2010 | Ravishankar et al. |
| 2014/0146954 | A1 | 5/2014 | Noldus et al. |
| 2015/0117439 | A1 | 4/2015 | Efrati |

(Continued)

FOREIGN PATENT DOCUMENTS

| EP | 3413550 A1 | 12/2018 | |
| JP | 2005020545 A | * 1/2005 | .......... H04M 1/2535 |
| WO | WO2014/178948 A1 | 11/2014 | |

OTHER PUBLICATIONS

U.S. Office Action for U.S. Appl. No. 17/101,333 dated Dec. 22, 2021.

(Continued)

*Primary Examiner* — Harry S Hong
*Assistant Examiner* — Jirapon Tulop
(74) *Attorney, Agent, or Firm* — FisherBroyles, LLP; Joseph Pagnotta

(57) ABSTRACT

Systems and methods for setting up a telephony communication include an operating system of a user telephony device diverting a call setup request made via a native dialer of the user telephony device to a telephony software application on the user telephony device. The telephony software application then sets up the requested telephony communication using a telephony communication application programming interface (API). The telephony communication may be setup in a way that results in the called party not receiving information about the calling party or the calling party's telephone number.

20 Claims, 9 Drawing Sheets

(56) References Cited

U.S. PATENT DOCUMENTS

2015/0373182 A1    12/2015  Tichauer
2019/0158656 A1*  5/2019  Bennett ................. H04M 1/658

OTHER PUBLICATIONS

U.S. Office Action for U.S. Appl. No. 17/101,333 dated Jun. 24, 2022.
https://developer.android.com/reference/android/telecom/CallDirectionService; Feb. 9, 2021; 48 pages.
https://developer.android.com/reference/android/app/role/RoleManager; Feb. 9, 2021; 9 pages.
International Search Report dated Feb. 8, 2022 for PCT/US2021/056004.
Written Opinion dated Feb. 8, 2022 for PCT/US2021/056004.

* cited by examiner

SYSTEMS AND METHODS FOR HANDLING A TELEPHONY COMMUNICATION SETUP REQUEST

This application is a continuation of U.S. application Ser. No. 17/101,333, which was filed on Nov. 23, 2020, the entire contents of which are incorporated herein by reference.

BACKGROUND OF THE INVENTION

Today's telephony devices include smartphones, cellular telephones and various computing devices which can be configured to act as a telephony device when running a telephony software application. Telephony devices in general, and in particular mobile telephony devices, have become a fundamental component of daily life. Unfortunately, negative exploitation of such technology creates undesirable results including fraud schemes, identity theft, cyberbullying and the like. Accordingly, online/digital security for telephony devices is a concern as technology assists humans in a greater number of aspects and as mobile communications systems and platforms become more ubiquitous.

There are situations where monitoring the activity of a telephony device is necessary for safety and economic reasons. For example, young children/pre-teens use mobile telephony devices as part of their regular daily life. Yet protecting a child's identity and electronic environment continues to be a challenge. When making an outbound call, a child may not understand or realize the potential implications of revealing their identity, by virtue of the caller ID information that is presented to the calling party. The caller ID information can include both the calling party's name and a telephone number or other identifier associated with the calling party's telephony device or associated with a telephony software application that is running on the calling party's telephony device. Prior methods of protecting a child's identity include a very manual process of parental oversight or supervision when making a call or using a blanket number blocking feature that is available at the system level of a telephony service provider. These methods are far from ideal. It would be desirable to have a way of automatically shielding the identity of a caller, either for all calls made, or on a call-by-call basis.

In a broader sense, there is a need to monitor and possibly control the communications of those who have limited authority/access to certain defined usages. In a second example, a business may lend communications devices (i.e., cell phones, laptops, etc.) to its employees with the understanding that the communications devices be used solely for business-oriented communications. Unfortunately, some employees may not abide by these regulations, thereby potentially costing the business money for excessive long-distance charges, data usage or other types of improper activity. Therefore, and as indicated earlier, there is a desire to automate the oversight of communications activity on a per-call basis in a manner that is both efficient and effective for someone in an authority role to monitor.

DETAILED DESCRIPTION OF PREFERRED EMBODIMENTS

Figure 1:
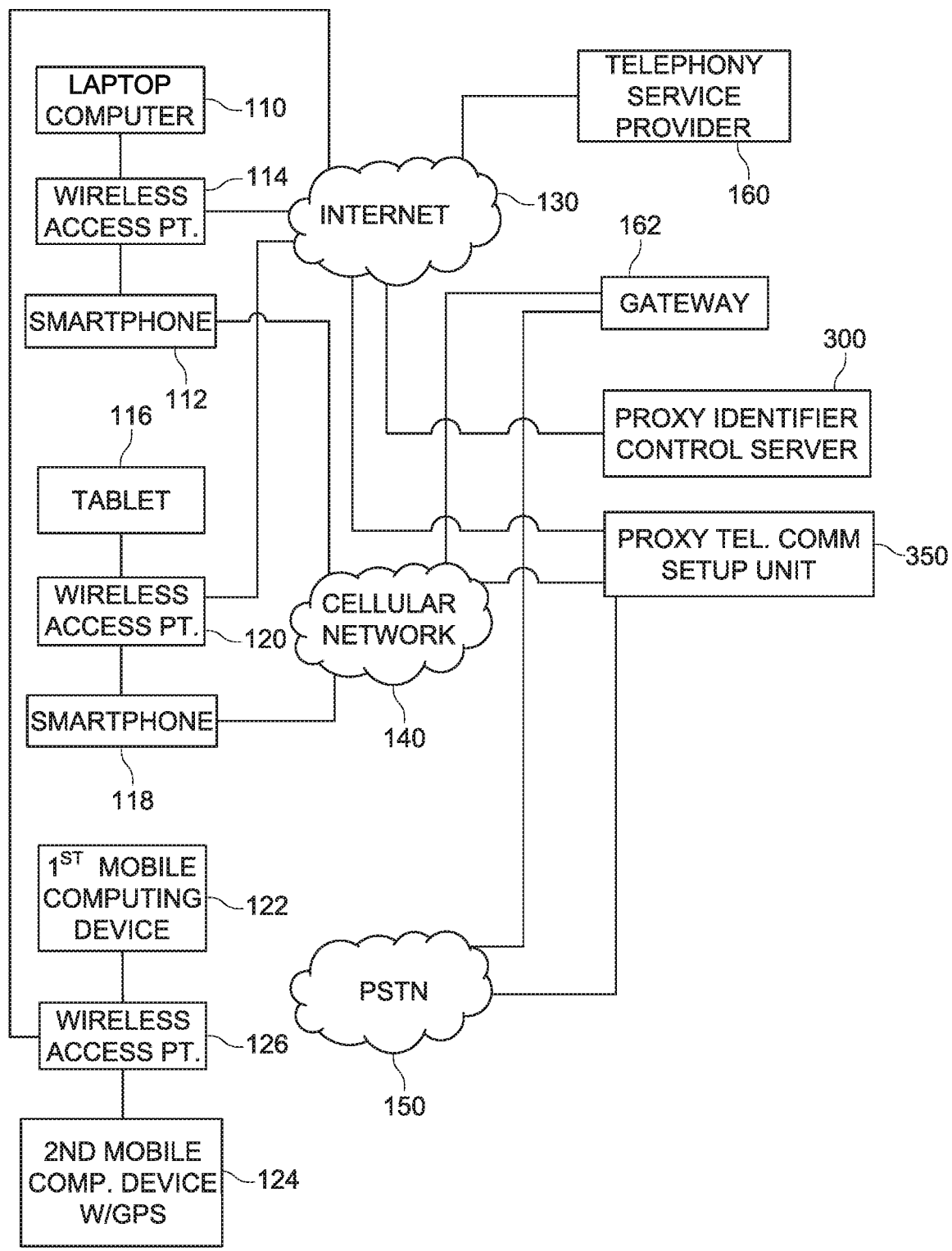
FIG. 1 is a diagram of a communications environment in which methods embodying the invention could be performed.

The following detailed description of preferred embodiments refers to the accompanying drawings, which illustrate specific embodiments of the invention. Other embodiments having different structures and operations do not depart from the scope of the present invention.

The systems and methods disclosed herein utilize a feature of a telephony device's operating system in which a user's request for the setup of an outgoing telephony communication, such as an audio or video call, results in handoff of the telephony communication setup request to a telephony software application on the user's telephony device. In some instances, the user's request for the setup of a telephony communication could be made via the native dialer of the user's telephony device. In other instances, the user's request for the setup of a telephony communication could be made via a different software application on the user's telephony device. In any event, the operating system of the user's telephony device intervenes and passes the telephony communication setup request off to the telephony software application. This typically includes providing the telephony software application with the telephone number or identity of the party that the user was attempting to reach. For purposes of the following description, this will be referred to as a "diverted" telephony communication setup request.

A user could request the setup of many different types of outgoing telephony communications. A user could request the setup an outgoing audio call or an outgoing video call. A user may also request that a SMS or MMS message be sent to another party. For purposes of the following description, any type of requested outgoing communication may be referred to as a "telephony communication." The user requesting the setup of a telephony communication may be referred to as the user or the calling party, even when the requested telephony communication involves exchanging SMS/MMS messages. The party with whom the user is attempting to communicate will be referred to as the called party.

Once the telephony software application has control of the setup of the requested telephony communication, the telephony software application can take numerous actions, in addition to or instead of setting up the requested telephony communication. For example, the telephony software application could connect the user to a virtual assistant that can help setup the requested telephony communication, or take other actions as directed by the user. The virtual assistant may also be able to answer questions for the user or retrieve and present information to the user.

The telephony software application also could setup the requested telephony communication for the user, but also cause the call to be recorded. If the call is recorded, the telephony software application could also send the recording to the user, to the called party and/or to a monitoring entity. Further, the telephony software application could cause a transcription of the recording to be generated. The telephony software application could then have the transcription sent to the user, the called party and/or to a third party.

In instances where the user requested telephony communication is a customer service call or perhaps a sales call, once the telephony software application sets up the telephony communication for the user, the telephony software application could cause a sentiment analysis unit to monitor the telephony communication. If the sentiment analysis unit detects that the telephony communication is going poorly, such as where the called party appears to be upset, the telephony software application could conference in a supervisor who could intervene in an attempt to correct or calm the situation.

In other instances, the telephony software application could monitor the identity of the called party, the duration of the telephony communication and other information about the telephony communication, and then later report that information to a supervisory entity. This could be helpful when the telephony device is a company-provided telephony device which is only to be used for business purposes.

As mentioned above, in some instances it may be desirable to automatically shield the identity of a calling party when the calling party requests the setup of a telephony communication with a called party. As will be described in detail below, the telephony software application could act to setup the requested telephony communication in such a way that the identity of the calling party is not revealed to the called party.

The telephony software application could take a wide variety of other actions, in addition to those mentioned above, when the user requests the setup of an outgoing telephony communication. The above-mentioned examples are not exhaustive and are not intended to be limiting of the claimed invention.

Before turning to a detailed description of how systems and methods embodying the invention accomplish the above-discussed functions, we will first discuss an environment in which systems and methods embodying the invention can be performed, as illustrated in FIG. 1. In this environment, a first user has a laptop computer 110 and a smartphone 112. Both the laptop computer 110 and the smartphone 112 can connect to a wireless access point 114 to access a wide area network, such as the Internet 130. The smartphone 112 also may be capable of accessing the Internet 130 via a link to a cellular network 140.

A second user has a tablet 116 and a smartphone 118 that communicate with the Internet 130 through a second wireless access point 120. The smartphone 118 also may be capable of accessing the Internet 130 via a cellular network 140.

A third user has a first mobile computing device 122 and a second mobile computing device 124 that includes a GPS unit. The first mobile computing device 122 and the second mobile computing device 124 can communicate with the Internet 130 via a third wireless access point 126. The first mobile computing device 122 could be any type of mobile computing device capable of running a telephony software application. Examples include a laptop computer, a personal digital assistant and a tablet computing device.

A telephony service provider 160 provides telephony service to telephony software applications resident on the smartphone 112, the laptop computer 110, the tablet 116, the smartphone 118, the first mobile computing device 122 and second mobile computing device 124 using packet-switched network techniques and protocols such as Voice over Internet Protocol (VoIP). VoIP may be implemented using proprietary protocols and protocols based on various standards, including Session Initiation Protocol (SIP), Media Gateway Control Protocol (MGCP), Real Time Transport Protocol (RTP), Session Description Protocol (SDP), H.323 and H.248. One such VoIP telephony service provider is Vonage Holdings Corp. of Holmdel, New Jersey. The telephony service provider 160 can communicate directly with the telephony software applications via the Internet 130. In addition, the telephony service provider 160 can communicate through a cellular network 140 or a publicly switched telephone network (PSTN) 150 via a gateway 162. This allows the telephony service provider 160 to connect telephone calls between the telephony software applications and parties that are reachable via a VoIP telephone call that traverses the Internet 130 as well as parties that are reachable via the cellular network 140 or the PSTN 150.

As mentioned above, when a user requests the setup of a new outgoing telephony communication, and the operating system of the user's telephony device diverts setup of the requested telephony communication to a telephony software application on the user's telephony device, one of the things that the telephony software application can do is setup the requested telephony communication such that the called party is not provided with the identity of the user. For purposes of the following description, we will refer to a telephony communication where the called party is not presented with the identifier of a calling party's telephony device or an identifier associated with a telephony software application running on the calling party's telephony device as a "confidential telephony communication."

Systems and methods embodying the invention can operate to assign a temporary proxy identifier that can be substituted for the identifier that is assigned to the calling party's telephony device or to a telephony software application running on the calling party's telephony device. When the calling party requests the setup of a new telephony communication to a called party, the called party is presented with the proxy identifier or possibly some other identifier instead of the identifier associated with the calling party's telephone device or a telephony software application running on the calling party's telephony device.

For example, if the telephony communication is a telephone call, the called party would typically be presented with caller ID information that includes the calling party's telephone number. If the calling party used the native dialer of a telephony device to setup the telephone call, the originating identifier presented to the called party would be the telephone number assigned to the native dialer of calling party's telephony device. If the calling party used a telephony software application on the calling party's telephony device to setup the telephone call, the originating identifier presented to the called party in the caller ID information could be a telephone number associated with the telephony software application. Of course, the destination identifier for the telephone call would be the telephone number assigned the called party's telephony device.

When it is desirable to setup a confidential telephony communication, when the calling party requests the setup of a telephone communication a proxy identifier is assigned for the telephony communication. The proxy identifier can be a telephone number. The proxy identifier is used to help setup the telephony communication in such a way that the calling party's telephone number is not presented to the called party as part of the caller ID information presented to the called party. This helps to preserve a degree of confidentiality in that the called party will not thereafter know the telephone number assigned to the calling party's telephony device. In some embodiments, the assigned proxy identifier is presented to the called party in the caller ID information that provided to the called party. In other embodiments, an identifier or telephone number other than the proxy identifier could be included in the caller ID information presented to the called party, or no calling party telephone number may be presented to the called party.

In some embodiments, although the proxy identifier is included in the caller ID information presented to the called party as the originating telephone number, the calling party's actual name could also be included in the caller ID information. This would likely help to cause the called party accept the incoming telephony communication. However, the called party still would not know the telephone number assigned to the calling party's telephony device because the proxy identifier, some other alternate identifier or no identifier would be included in the caller ID information as the originating telephone number. In other instances, even the calling party's name is excluded from the caller ID information presented to the called party.

Returning now to FIG. 1, a proxy identifier control server 300 assigns proxy identifiers that are used to help setup confidential telephony communications. The functions performed by the proxy identifier control server 300 are discussed in detail below. In some embodiments, the proxy identifier control server 300 may be part of or may be controlled by a telephony service provider 160. In other instances, the proxy identifier control server 300 may be independent from a telephony service provider 160.

A proxy telephony communication setup unit 350 is configured to setup confidential telephony communications for users. As such, the proxy telephony communication setup unit 350 may be a part of or may be controlled by a telephony service provider 160. In other embodiments, the proxy telephony communication setup unit 350 may be independent from a telephony service provider 160. Details of the functions performed by the proxy telephony communication setup unit 350 are provided below.

Figure 2:
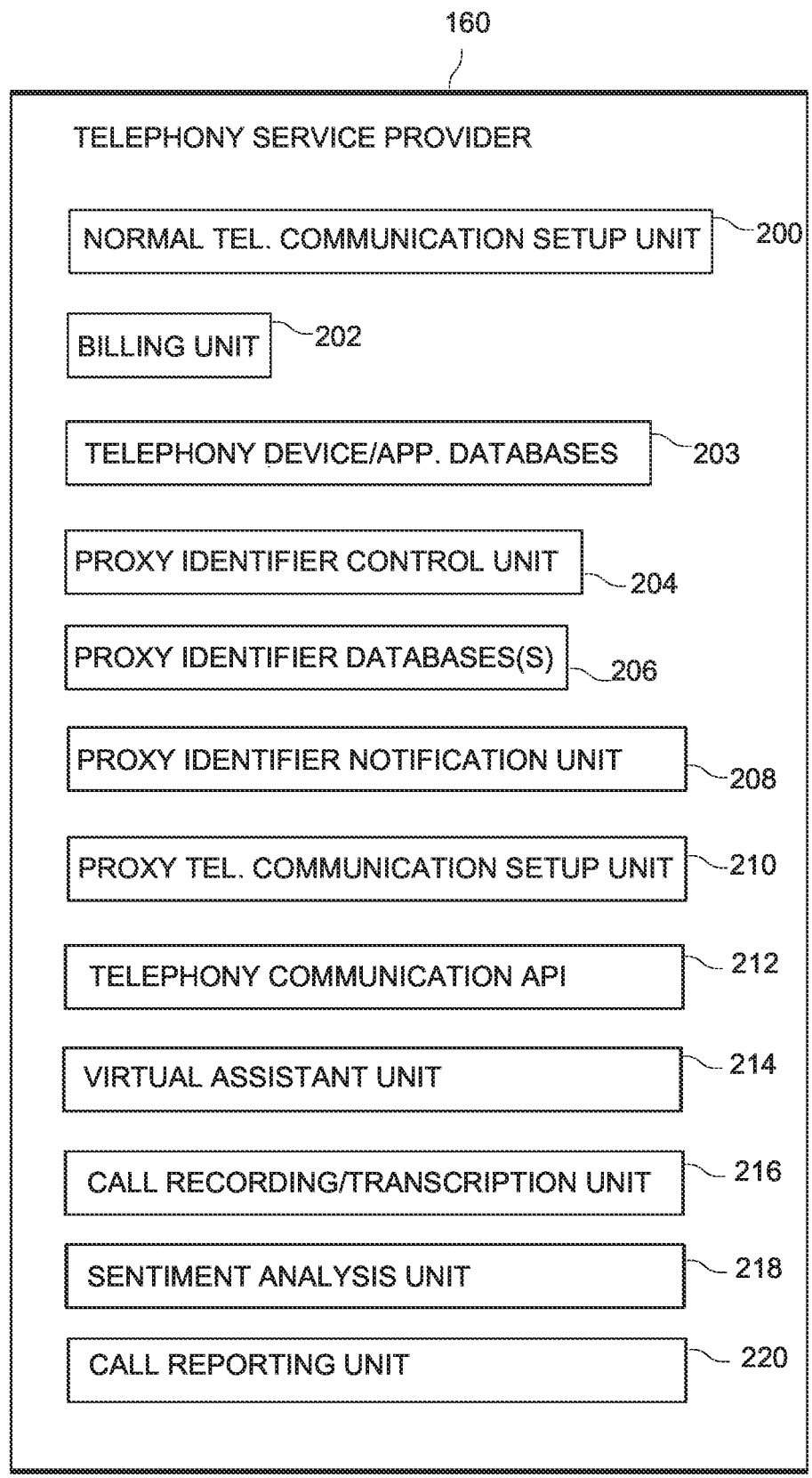
FIG. 2 is a diagram of selected elements of a telephony service provider.

FIG. 2 illustrates selected elements of a telephony service provider 160. As illustrated in FIG. 2, the telephone service provider 160 can include a normal telephony communication setup unit 200 which is configured to either setup outgoing telephony communications for individuals that are provided telephony service by the telephony service provider 160, or connect incoming telephony communications that are directed to individuals that are provided telephony service by the telephony service provider 160. The telephony communications could be audio or video telephone calls, audio or video conferences, text (SMS, MMS) messages, or other forms of communications. Thus, the term "telephony communication" is intended to include any sort of communication between two or more parties.

The telephony service provider 160 also includes a billing unit 202 that tracks the telephony services provided to customers of the telephony service provider 160 and which bills the customers for the provided services.

The telephony service provider 160 includes telephony device and telephony application databases 203. The databases 203 can include a variety of different information about individual user telephony devices, or instances of telephony software applications that have been installed on user telephony devices. Among other information, the telephony device and telephony application databases 203 can indicate whether certain actions should be taken when a telephony software application on a user's telephony device is helping to setup a telephony communication for a user based on a diverted telephony communication setup request. As will be explained in greater detail below, when a telephony software application on a user's telephony device handles a diverted telephony communication setup request, actions in addition to simply setting up the telephony communication may be performed. These actions could include recording the telephony communication, transcribing the recording of a telephony communication, performing a sentiment analysis on the telephony communication and reporting aspects of the telephony communication to a monitoring entity. The telephony software application on the user's telephony device can consult the telephony device and telephony application databases 203 to determine what, if any, additional functions are to be performed.

The telephony service provider 160 further includes a proxy identifier control unit 204 that is responsible for assigning a proxy identifier when a user requests the setup of a confidential outbound telephony communication. As mentioned above, the proxy identifier is used to help setup the outbound telephony communication in such a way that the identifier assigned to the user's telephony device or the identifier assigned to a telephony software application running on the user's telephony device is not revealed to the called party as part of the caller ID information provided to the called party. Details about how this accomplished are provided below.

A proxy identifier database or databases 206 are used to track the available proxy identifiers and the identifiers associated with user telephony devices to which the proxy identifier may be assigned. The identifiers associated with user telephony devices can include identifiers assigned to the native dialer of a user telephony device and the identifier assigned to or associated with a telephony software application running on a user telephony device. Details of the information stored in the proxy identifier databases 206 are explained below.

A proxy identifier notification unit 208 informs at least a user's telephony device of the proxy identifier that has been assigned for purposes of setting up a confidential telephony communication. The proxy identifier notification unit 208 may also inform a proxy telephony communication setup unit 210 of the proxy identifier that has been assigned to a user's telephony device for purposes of setting up a confidential telephony communication. The information provided to a proxy telephony communication setup unit 210 could also include the identifier assigned to or associated with the user's telephony device and the identifier of the called party's telephony device. The proxy telephony communication setup unit 210 could be party of the telephony service provider 160, or the proxy telephony communication setup unit could be an independent proxy telephony communication setup unit 350.

The proxy telephony communication setup unit 210 of the telephony service provider 160 is configured to setup confidential telephony communications for a user. Details of how the proxy telephony communication setup unit 210 accomplish these functions are provided below.

The telephony service provider also 160 includes a telephony communication application programming interface (API) 212. A telephony software application running on a user's telephony device, which is responding to a diverted telephony communication setup request, can send a communication via a data network 130 to the telephony communication API 212 to request the setup of the requested telephony communication. The telephony communication API 212 may then utilize the services of other elements of the telephony service provider 160 to setup the requested telephony communication. Also, when the telephony communication API 212 is setting up a telephony communication in response to a diverted telephony communication setup request, the telephony communication API 212 may consult the telephony device and telephony application databases 203 to determine if other actions, in addition to setup of the telephony communication should occur. If so, the telephony communication API 212 may act to cause those additional actions to occur. Details about how the telephony communication API 212 interacts with and responds to a telephony software application on a user's telephony device are provided below.

The telephony service provider 160 further includes a virtual assistant unit 214. The virtual assistant unit 214 provides the functions of a virtual assistant to a user for purposes of accomplishing various tasks. The virtual assistant unit 214 may be configured to interact with a user via speech or audio commands. This means a user may ask the virtual assistant unit 214 to perform a certain function or to retrieve certain information using speech-based commands. The virtual assistant unit 214 is configured to receive and interpret those speech-based commands and to then respond accordingly to those speech-based commands.

In some embodiments, the virtual assistant unit 214 also may be configured to interact with a user via text-based commands. This means that the user could enter text-based commands or requests directed to the virtual assistant unit 214 via the user's telephony device. The virtual assistant unit 214 would then interpret the user's text-based commands or requests and respond accordingly. The response provided by the virtual assistant unit 214 could take the form of text-based responses. Alternatively, the virtual assistant unit 21 could respond to a text-based command or request by sending audio or video to the user's telephony device.

The telephony services provider 160 also includes a call recording and transcription unit 216. As mentioned above, a telephony software application on a user's telephony device may take certain actions when it receives control of a diverted call setup request. Those actions can include setting up the requested telephony communication and recording the telephony communication. The call recording/transcription unit 216 is configured to record a telephony communication at the direction of the telephony software application on the user's telephony device. The call recording/transcription unit 216 may also transcribe a recording of a telephony communication. Further, the call recording/transcription unit may be configured to send a recording and/or transcription of a telephony communication to the calling party, the called party or a third party.

FIG. 2 only illustrates a selected few of the elements that are typically present in a telephony service provider. Also, a telephony service provider embodying the invention may not include all of the elements depicted in FIG. 2. For these reasons, the depiction in FIG. 2 should in no way be considered limiting.

Figure 3:
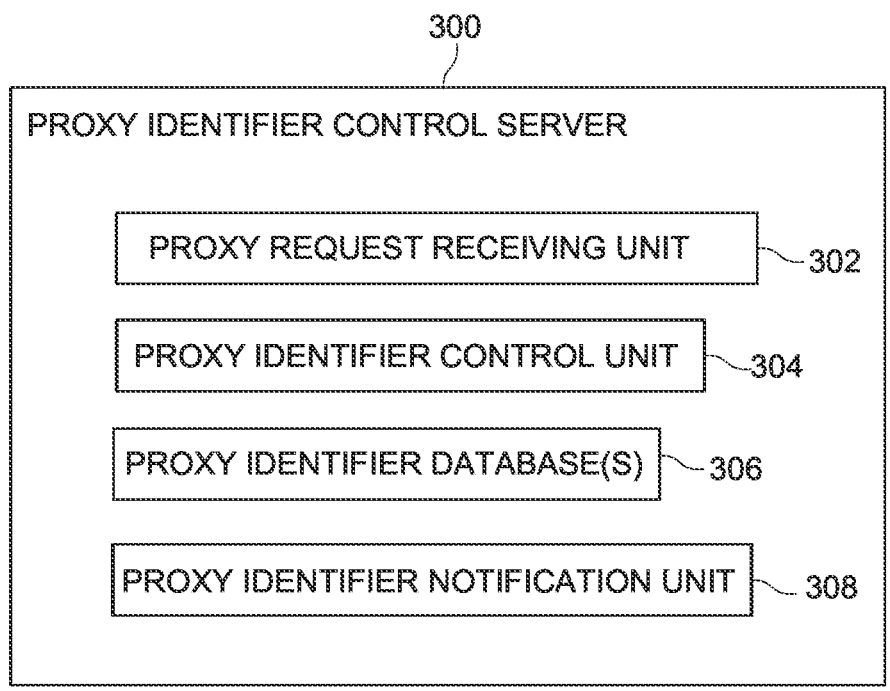
FIG. 3 is a diagram of selected elements of a proxy identifier control server that could control the assignment of proxy identifiers.

FIG. 3 illustrates selected elements of a proxy identifier control server 300. As mentioned above, the proxy identifier control server 300 may be part of or may be controlled by a telephony service provider 160, or the proxy identifier control server 300 may be independent from a telephony service provider 160.

The proxy identifier control server 300 includes a proxy request receiving unit 302 that is configured to receive a request for the assignment of a proxy identifier when a user is attempting to setup an outbound confidential telephony communication. The proxy identifier control server 300 further includes a proxy identifier control unit 304 that is responsible for assigning a proxy identifier in response to a request for a proxy identifier. Details about how this is accomplished are provided below.

A proxy identifier database or databases 306 are used to track the available proxy identifiers, and also the identifiers assigned to or associated with user telephony devices which may be temporarily or permanently paired with a proxy identifier. Details of the information stored in the proxy identifier database(s) 306 are explained below.

A proxy identifier notification unit 308 informs at least the telephony software application on a user's telephony device of the proxy identifier that has been assigned for purposes of setting up a confidential telephony communication. The proxy identifier notification unit 308 may also inform a proxy telephony communication setup unit 210/350 of the proxy identifier that has been assigned to a user's telephony device for purposes of setting up a confidential telephony communication. In some embodiments, the proxy identifier notification unit 308 may inform a proxy telephony communication setup unit 210/350 of the identifier assigned to a user's telephony device and the identifier of a called party's telephony device.

A proxy identifier control server 300 embodying this technology can include other elements in addition to those depicted in FIG. 3. Likewise, a proxy identifier control server 300 embodying the technology may not include all of the elements depicted in FIG. 3. Thus, FIG. 3 should in no way be considered limiting.

Figure 4:
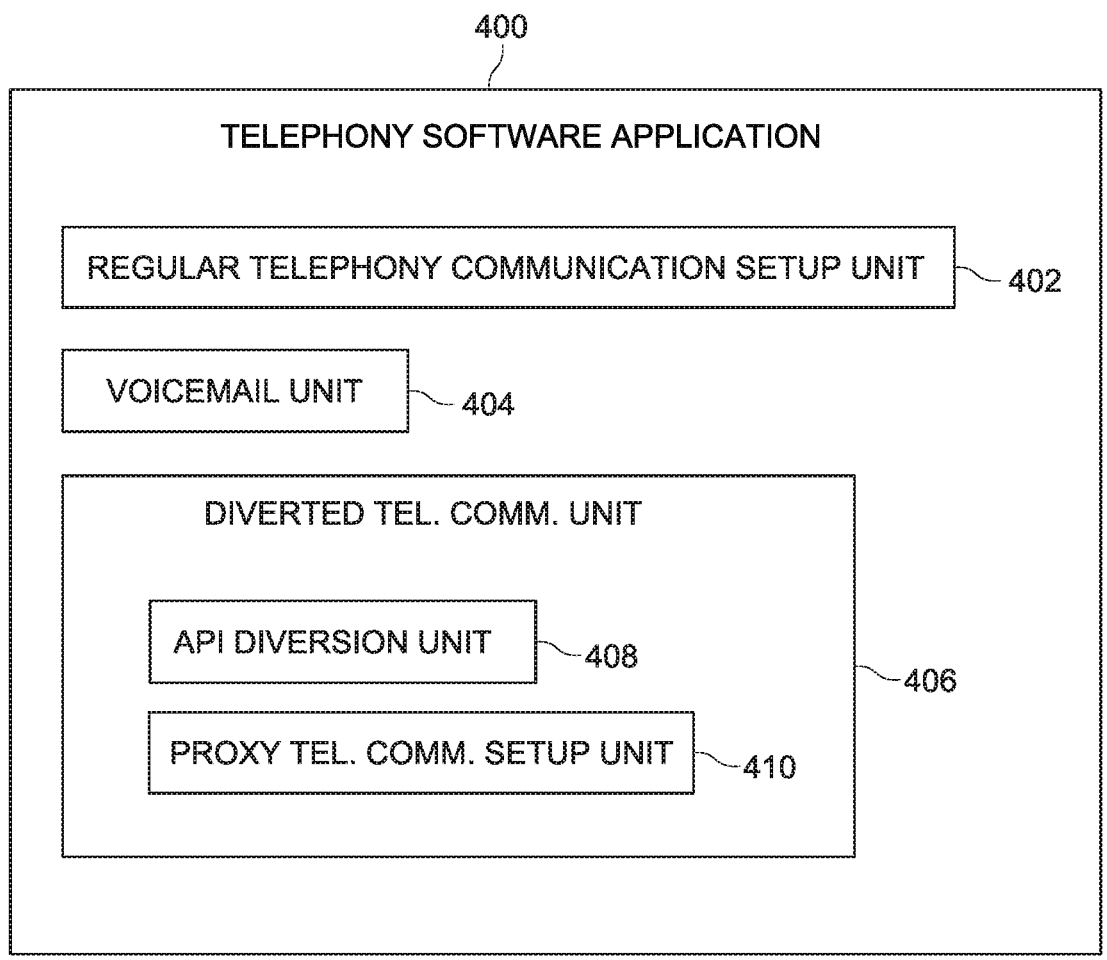
FIG. 4 is a diagram of selected elements of a telephony software application that can be installed on a computing device such as a smartphone, a laptop computer or a desktop computer.

FIG. 4 illustrates elements of a telephony software application 400 that would be installed on a user's telephony device, such as a smartphone, a mobile computing device or desktop computing device. The telephony software application 400 includes a regular call setup unit 402 that is configured to setup regular telephony communications that use an identifier assigned to either the user's telephony device or to the telephony software application 400 as the originating identifier for the telephony communication. This means that telephony communications setup by the regular call setup unit 402 would involve presenting the called party with the identifier assigned to the calling party's telephony device or the identifier assigned to a telephony software application running on the calling party's telephony device as part of the caller ID information.

A voicemail unit 404 handles the recording and playback of voicemails.

As explained above, the operating system of some user telephony devices are capable of diverting a user's regular request for the setup of a telephony communication to a software application on the telephony device. When this occurs, a diverted telephony communication unit 406 of the telephony software application 400 handles the diverted telephony communication setup request. Depending on how the diverted telephony communication unit 406 is configured, the diverted telephony communication unit 406 could take a variety of different actions when it receives a diverted telephony communication setup request.

In a simple example, an API diversion unit 408 of the diverted telephony communication unit 406 sends details of the diverted telephony communication setup request to the telephony communication API 212 of a telephony service provider 160. The telephony communication API 212 then handles setup of the requested telephony communication using various elements of the telephony services provider 160.

As also explained above, the diverted telephony communication setup unit 406 may take other actions or additional or alternate actions with respect to a diverted telephony communication setup request. For example, when the diverted telephony communication unit 406 receives a diverted telephony communication setup request, the diverted telephony communication unit 406 may connect the user's telephony device to a virtual assistant 214 of a telephony service provider 160. The user could then interact with the virtual assistant 214 to setup the requested telephony communication, or to take other actions.

In other instances, in addition to passing the diverted telephony communication setup request on to a telephony communication API 212, the diverted telephony communication unit 406 may enlist the services of a call recording/transcription unit 216 of the telephony service provider 160 to make a recording of the telephony communication and possible to also make a transcription of the recording.

In other instances, in addition to passing the diverted telephony communication setup request on to a telephony communication API 212, the diverted telephony communication unit 406 may enlist the services of a sentiment analysis unit 218 of the telephony service provider to monitor the telephony communication. The sentiment analysis unit 218 or the diverted telephony communication unit 406 may also be capable of conferencing in a supervisor if the sentiment analysis unit 218 determines there may be a problem with the telephony communication.

In still other instances, in addition to passing the diverted telephony communication setup request on to a telephony communication API 212, the diverted telephony communication unit 406 may enlist the services of a call reporting unit 220 of the telephony service provider 160 to record certain items of information relating to the telephony communication and possibly also to report on aspects of the telephony communication.

In instances where it is desirable to setup a confidential telephony communication, a proxy telephony communication setup unit 410 of the diverted telephony communication unit 406 acts to setup the requested confidential telephony communication. As is explained in detail below, the proxy telephony communication setup unit 410 is configured to obtain a proxy identifier and to then use the proxy identifier to help setup a confidential telephony communication. A proxy telephony communication setup unit 210/350 then assists the user's telephony device in establishing the telephony communication in a confidential way such that the identifier assigned to the user's telephony device or to a telephony software application running on the user's telephony device is not revealed to the called party as part of caller ID information presented to the called party.

In the above examples, the diverted telephony communication unit 406 took or caused various actions in response to receipt of a diverted telephony communication setup request. In alternate embodiments, the diverted telephony communication unit 406 may simply utilize the API diversion unit 408 to send the telephony communication setup request on to a telephony communication API 212 of a telephony service provider 106, and the telephony communication API 212 may be responsible for causing the alternate or additional actions to occur.

Figure 5:
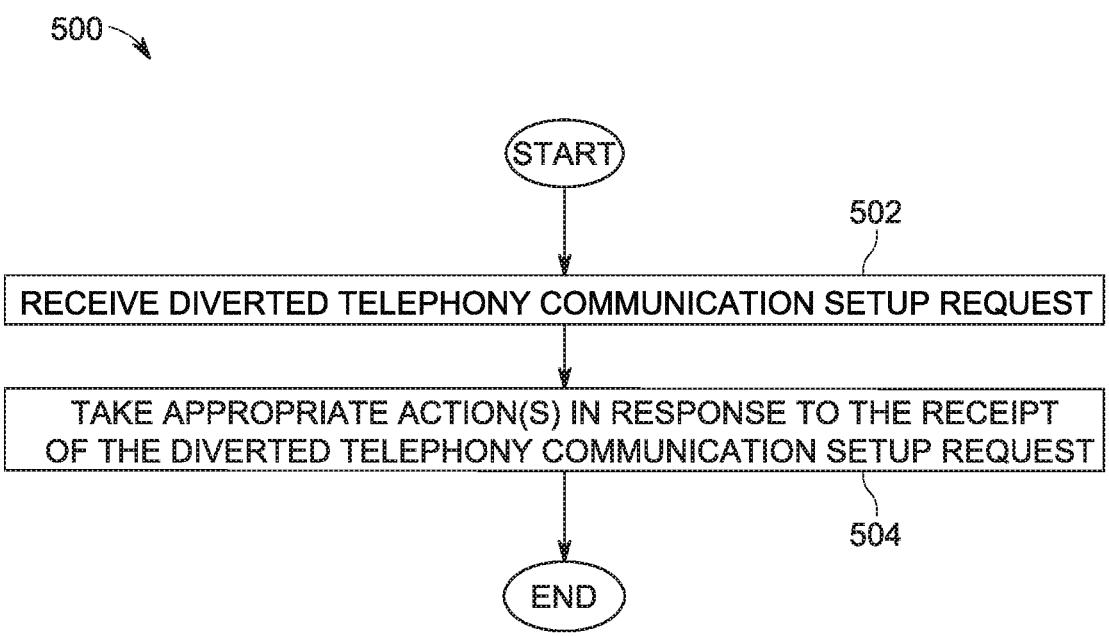
FIG. 5 is a flowchart illustrating steps of a first method performed by a telephony software application on a user's mobile telephony device.

FIG. 5 illustrates steps of a method 500 that would be performed by a diverted telephony communication unit 406 of a telephony software application 400. The method 500 begins and proceeds to step 502 where the diverted telephony communication unit 406 receives a diverted telephony communication setup request under the direction of an operating system of a user's telephony device. As explained above, this can occur when a user attempts to setup a telephony communication using the native dialer of the user's telephony device or some other software application on the user's telephony device. The method then proceeds to step 504, where the diverted telephony communication unit 406 takes an action or actions, depending on various factors. For example, in a simple situation step 504 could include the API diversion unit 408 of the diverted telephony communication unit 406 sending the diverted telephony communication setup request to a telephony communication API 212 of a telephony service provider 160 so that the telephony communication API 212 can setup the requested telephony communication.

As explained above, in other instances, step 504 could also or alternatively include the diverted telephony communication unit 406 enlisting the services of a virtual assistant 214 of the telephony services provider 160 to help the user with the setup or conduct of the requested telephony communication, or for other purposes. Step 504 might also include the diverted telephony communication unit 406 enlisting the services of a call recording/transcription unit 216 to record the requested telephony communication and perhaps also to generate a transcript of the recording of the telephony communication.

If the requested telephony communication is a customer service call or perhaps a sales call, the diverted telephony communication unit 406 may be configured to enlist the services of a sentiment analysis unit 218 of the telephony service provider 160. Then, depending on the feedback received from the sentiment analysis unit 218, the diverted telephony communication unit may be configured to conference a supervisor into the ongoing telephony communication.

Step 504 may also involve the diverted telephony communication unit 406 enlisting the services of a call reporting unit 220 to record various aspects of the telephony communication, such as the identity of the called party, the time of the telephony communication, the duration of the telephony communication and various other items of information. The diverted telephony communication unit 406 may also request that the call reporting unit 220 report on one or more aspects of the telephony communication to various parties.

In some embodiments, the diverted telephony communication unit 406 may be configured to indicate whether and when actions in addition to or instead of simply setting up the requested telephony communication should be performed. In other instances, the diverted telephony communication unit 406 may consult telephony device or telephony application databases 203 to determine if additional or alternate actions are to be performed.

In some embodiments, step 504 could include the diverted telephony communication unit 406 sending a communication to a telephony communication API 212 that both instructs the telephony communication API 212 to setup the requested telephony communication and to also cause other actions to occur. In yet other embodiments, when the telephony communication API 212 receives an instruction from the diverted telephony communication unit 406 to setup a telephony communication, the telephony communication API 212 may consult telephony device or telephony application databases 203 to determine if additional or alternate actions should occur. The telephony communication API 212 could then act to cause any additional or alternate actions to occur.

Once all actions in step 504 are completed, the method ends.

The above examples of what the diverted telephony communication unit 406 could do in step 504 are in no way intended to be limiting. The diverted telephony communication unit 406 could take other actions or enlist the services of various other entities or elements to accomplish such other actions. For example, as will be described below the diverted telephony communication unit 406 may cause a confidential telephony communication to be setup for the user.

The setup of a confidential telephony communication using a proxy identifier typically includes the coordination of three different elements. First, there is the user's telephony device. As mentioned above, the user's telephony device could take many different forms. In some instances, the user's telephony device could be a smartphone that is running a telephony software application 400. In other instances, a user's mobile computing device such as a laptop computer or a tablet device, or a user's desktop computer, could be running a telephony software application 400 so that it is configured to act as a telephony device.

Second, there is a proxy identifier control unit 204/304 that is responsible for assigning a proxy identifier to the user's telephony device for purposes of the confidential telephony communication or which is responsible for looking up a proxy identifier that already has been assigned to the user's telephony device.

Third, there is a proxy telephony communication setup unit 210/350 that helps to establish the confidential telephony communication between the user's telephony device and the called party's telephony device.

Figure 6:
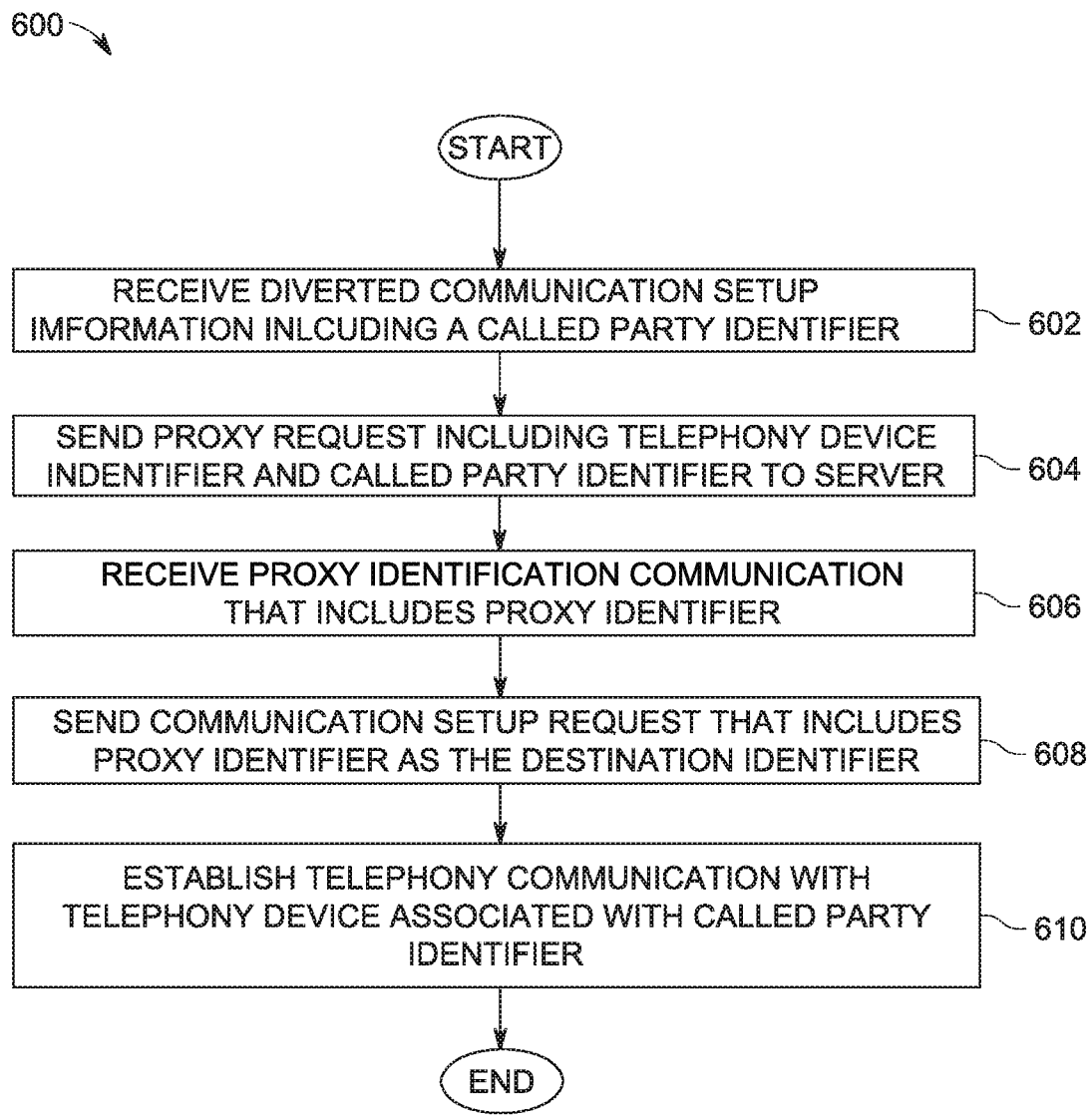
FIG. 6 is a flowchart illustrating steps of a second method performed by telephony software application on a user's mobile telephony device.
Figure 7:
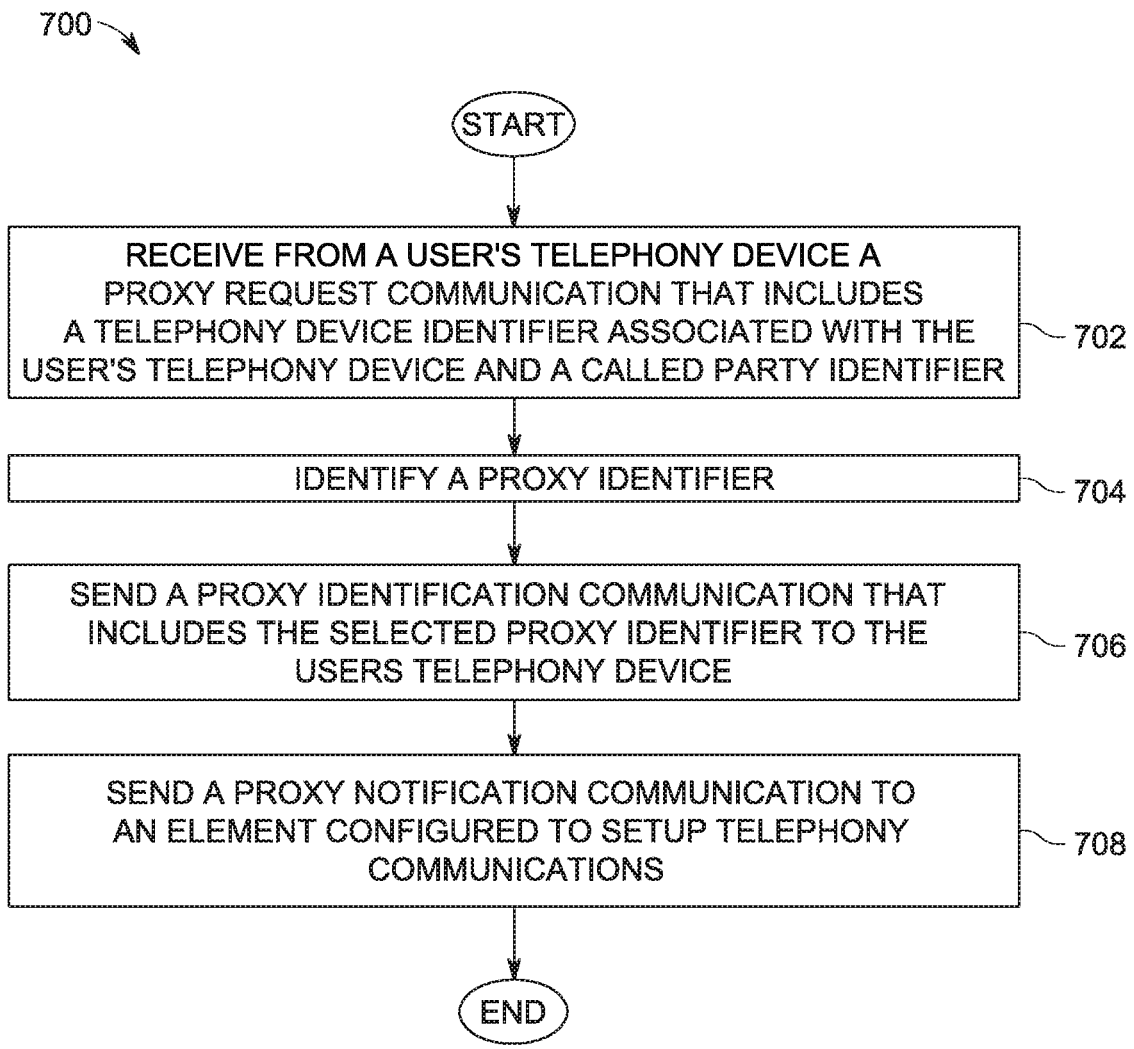
FIG. 7 is a flowchart illustrating steps of method performed by a proxy identifier controller.
Figure 8:
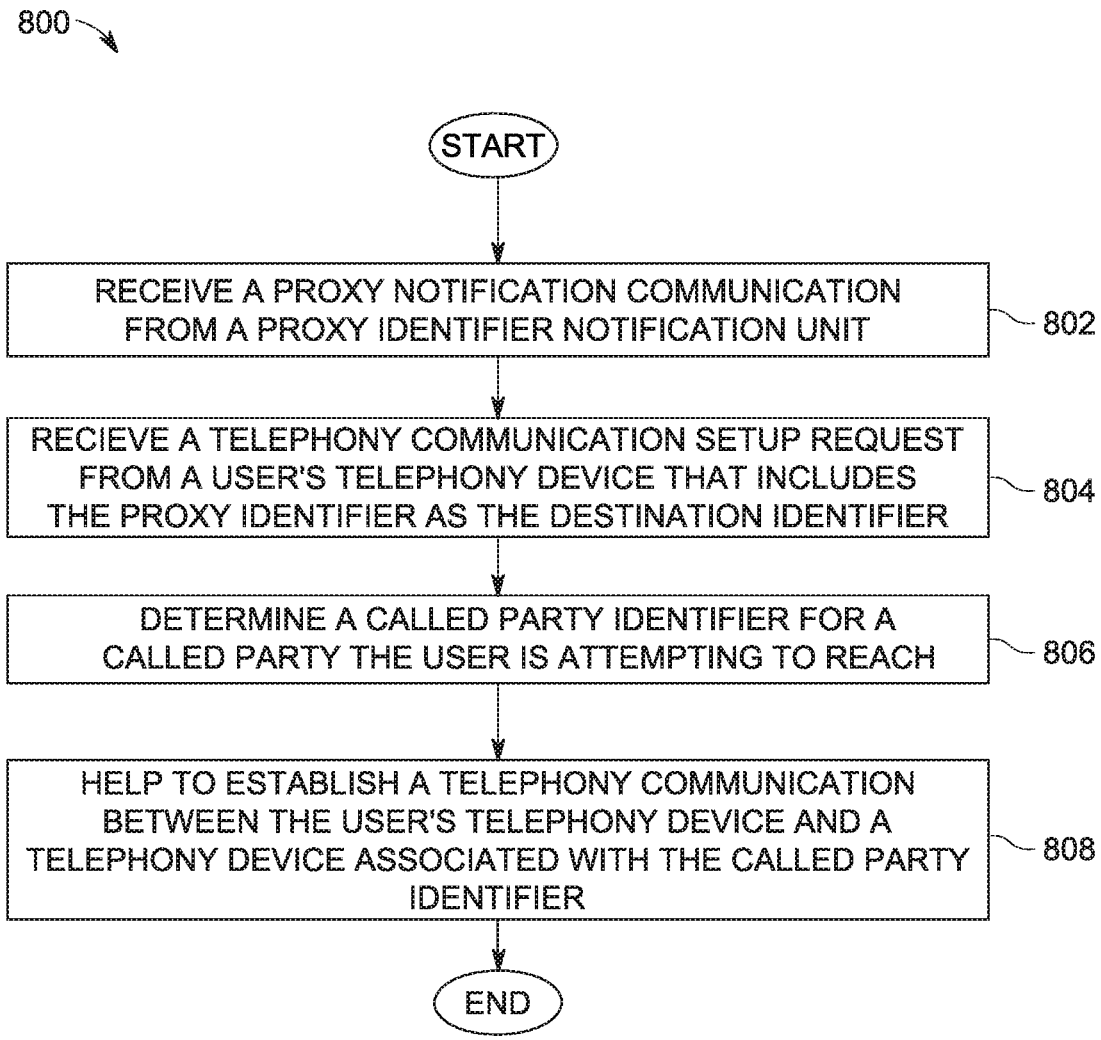
FIG. 8 is a flowchart illustrating steps of a method performed by a proxy telephony communication setup unit to help establish a telephony communication between a user's telephony device and a called party's telephony device.

FIG. 6 illustrates steps of a method performed by the diverted telephony communication unit 406 of a telephony software application 400 on a user's telephony device as part of the overall processes of setting up a confidential telephony communication between the user's telephony device and a called party's telephony device. FIG. 7 illustrates steps of a method performed by a proxy identifier control server 300 or elements of a telephony service provider 160 responsible for setting up confidential telephony communications. FIG. 8 illustrates steps of a method performed by a proxy telephony communication setup unit 210/350 to help establish a confidential telephony communication between a user's telephony device and a called party's telephony device. These three methods will be discussed together to help explain the overall process of setting up a confidential telephony communication.

The process of setting up a confidential telephony communication begins when a user requests the setup of an outgoing telephony communication to a called party. The telephony communication could be an audio or video telephone call, an audio or video conference call, a SMS/MMS message or some other form of telephony communication. For example, the user could request the setup of an outgoing telephone call using a native dialer of the user's telephony device. Alternatively, the user could request the transmission of a text message using a text messaging application on the user's telephony device. In such instances, an operating system of the user's telephony device could be pre-configured to bypass the native dialer or text messaging application and to hand off setup of the requested telephony communication to a telephony software application on the smartphone. In other instances, the user may directly use a telephony software application on a smartphone, laptop computer, tablet, desktop computer or some other computing device to request the setup of a confidential outgoing telephony communication directed to a called party.

In any event, the method 600 illustrated in FIG. 6 would begin and proceed to step 602 where the diverted telephony communication unit 406 of the telephony software application 400 on the user's telephony device receives the diverted telephony communication setup request. The diverted telephony communication setup request would typically include at least a called party identifier assigned to or associated with the called party's telephony device. In step 604, a proxy telephony communication setup unit 410 of the diverted telephony communication unit 406 sends a proxy request communication to either a proxy identifier control unit 204 of a telephony service provider 160 or to a proxy request receiving unit 302 of a separate proxy identifier control server 300. The proxy request communication asks for a proxy identifier that can be used to help setup a confidential telephony communication. The proxy request communication would include an identifier associated with the user's telephony device or an identifier associated with the telephony software application 400, as well as the called party identifier assigned to or associated with the called party's telephony device.

Referring now to FIG. 7, the method 700 illustrated in FIG. 7 would begin and proceed to step 702, where either a proxy identifier control unit 204 of the telephony service provider 160 or a proxy request receiving unit 302 of a separate proxy identifier control server 300 receives the proxy request communication from the proxy telephony communication setup unit 410 of the telephony software application 400 on the user's telephony device. Next, in step 704, the proxy identifier control unit 204 of the telephony service provider or the proxy identifier control unit 304 of a separate proxy identifier control server 300 identifies a proxy identifier that will be used to help establish the requested confidential telephony communication with the called party.

In some instances, the proxy identifier control unit 204/304 may consult one or more proxy identifier database(s) 206/306 to determine which proxy identifiers are available for use and to then select an available proxy identifier. The proxy identifier can be a regular telephone number similar to the telephone number assigned to the native dialer of the user's telephony device or to the telephony software application 400 on the user's telephony device. In other instances, the proxy identifier could take some other form besides a telephone number, such as a Session Initiation Protocol (SIP) Universal Resource Indicator (URI) which can take the form of "sip:username@host" or "sip:username@host:port."

In some embodiments, a telephony service provider 160 may have a library of proxy identifiers that it controls. In that instance, a telephony communication setup request directed to such a proxy identifier will be received by the telephony service provider 160 itself. As will be explained in detail below, the telephony service provider 160 can then act to help establish a confidential telephony communication to the called party's telephony device.

Alternatively, some or all of the proxy identifiers could be controlled by a separate proxy telephony communication setup unit 350. In this instance, a telephony communication setup request directed to such a proxy identifier will be received by the separate proxy telephony communication setup unit 350, which could then help to establish the requested confidential telephony communication.

Similarly, if a proxy identifier control unit 304 of a separate or independent proxy identifier control server 300 is identifying the proxy identifier, the proxy identifier control unit 304 could select a proxy identifier controlled by a telephony service provider 160 in those instances where the telephony service provider 160 will act to help establish the requested telephony communication. Alternatively, the proxy identifier control unit 304 could select a proxy identifier controlled by a separate or independent proxy telephony communication setup unit 350 in those instances where a separate or independent proxy telephony communication setup unit 350 will act to help establish the requested telephony communication.

In some embodiments, each time that a telephony software application 400 on a user's telephony device sends a proxy request communication to the proxy identifier control unit 204/304, the proxy identifier control unit 204/304 may select a new proxy identifier that will only be used once for the requested confidential telephony communication. In other instances, the proxy identifier control unit 204/304 may assign a proxy identifier to the user's telephony device that can be reused multiple times for multiple confidential telephony communications. In this case, the proxy identifier control unit 204/304 could consult a proxy identifier database 206/306 to determine which proxy identifier already has been paired with the user's telephony device.

The proxy identifier control unit 204/304 may select a proxy identifier that is associated with the same geographical area as the identifier assigned to the native dialer of the user's telephony device or to the telephony software application 400 on the user's telephony device. In other instances, the proxy identifier control unit 204/304 may select a proxy identifier that is associated with a random geographical area. In still other instances, the proxy identifier control unit 204/304 may deliberately select a proxy identifier associated with a geographical area that is different from the geographical area associated with the identifier assigned to the native dialer of the user's telephony device or to the telephony software application 400 on the user's telephony device to help mask the user's identity.

Next, in step 706 a proxy identifier notification unit 208 of the telephony service provider 160 or the proxy identifier notification unit 308 of the separate proxy identifier control server 300 sends a proxy identification communication to the proxy telephony communication setup unit 410 of the telephony software application 400 on the user's telephony device. The proxy identification communication includes at least the proxy identifier which has been identified or selected by the proxy identifier control unit 204/304.

In step 708 the proxy identifier notification unit 208 of the telephony service provider 160 or the proxy identifier notification unit 308 of the separate proxy identifier control server 300 sends a proxy notification communication to either the proxy telephony communication setup unit 210 of the telephony service provider 160 or to a separate proxy telephony communication setup unit 350. The proxy notification communication includes: (1) the originating identifier that the telephony software application 400 will use when it attempts to setup the confidential telephony communication, which could be the identifier assigned to the native dialer of the user's telephony device or the identifier assigned to the telephony software application 400 on the user's telephony device; (2) the proxy identifier that has been assigned; and (3) the identifier of the called party's telephony device. The method in FIG. 7 then ends.

Returning now to FIG. 6, in step 606 the proxy telephony communication setup unit 410 of the software application 400 on the user's telephony device receives the proxy identification communication sent from the proxy identifier notification unit 208/308 which informs the proxy telephony communication setup unit 410 of the proxy identifier that has been assigned. In step 608 the proxy telephony communication setup unit 406 then sends a telephony communication setup request directed to that proxy identifier, meaning the proxy identifier would be the destination identifier in the telephony communication setup request. The telephony communication setup request also includes the identifier assigned to the native dialer of the user's telephony device or an identifier assigned to the telephony software application 400 as the originating identifier. In some instances, the proxy telephony communication setup unit 410 could send the call setup request to a telephony communication API 212 of the telephony service provider 160.

In instances where the proxy identification communication was sent from the proxy identifier notification unit 208 of the telephony service provider 160, and the proxy identifier is one controlled by the telephony service provider itself, the telephony communication setup request will be directed to the proxy telephony communication setup unit 210 of the telephony service provider 160. In instances where the proxy identification communication was sent from the proxy identifier notification unit 308 of the separate proxy identifier control server 300, and the proxy identifier is one controlled by the telephony service provider 160, the telephony communication setup request also will be directed to the proxy telephony communication setup unit 210 of the telephony service provider 160.

In instances where the proxy identification communication was sent from the proxy identifier notification unit 208 of the telephony service provider 160, and the proxy identifier is one controlled by a separate proxy telephony communication setup unit 350, the telephony communication setup request will be directed to the separate proxy telephony communication setup unit 350. Likewise, when the proxy identification communication was sent from the proxy identifier notification unit 308 of the separate proxy identifier control server 300, and the proxy identifier is one controlled by a separate proxy telephony communication setup unit 350, the telephony communication setup request also will be directed to the separate proxy telephony communication setup unit 350.

Turning now to FIG. 8, the method 800 begins and proceeds to step 802 where either the proxy telephony communication setup unit 210 of the telephony service provider 160 or the separate proxy telephony communication setup unit 350 will receive the proxy notification communication that informs the proxy telephony communication setup unit 210/350 of: (1) the identifier assigned to the native dialer of the user's telephony device or the identifier assigned to the telephony software application 400 on the user's telephony device; (2) the proxy identifier that has been assigned; and (3) the identifier of the called party's telephony device.

Next, in step 804, the proxy telephony communication setup unit 210/350 then receives the telephony communication setup request sent from the proxy telephony communication setup unit 410 of the telephony software application 400 on the user's telephony device. As mentioned above, this telephony communication setup request will include either the identifier assigned to a native dialer of the user's telephony device or an identifier assigned to the telephony software application 400 as the originating identifier, and the proxy identifier as the destination identifier.

In step 806, the proxy telephony communication setup unit 210/350 determines the called party identifier that the telephony software application is actually trying to reach using the information in the received proxy notification communication which associates the originating identifier and destination identifier (actually the proxy identifier) contained in the telephony communication setup request with the called party identifier.

In step 808, the proxy telephony communication setup unit 210/350 helps to setup the telephony communication between the telephony software application and the called party's telephony device. In some embodiments, this can be accomplished by the proxy telephony communication setup unit 210/350 setting up an outbound call leg to the called party's telephony device, setting up an outbound call leg to the telephony software application 400, and then bridging the two call legs together. FIG. 6 illustrates that the proxy telephony communication setup unit 410 of the telephony software application 400 also participates in establishing the telephony communication in step 610.

When the proxy telephony communication setup unit 210/350 sets up the outbound call leg to the called party's telephony device, the call setup request sent to the called party's telephony device does not include the identifier assigned to the native dialer of the user's telephony device or the identifier assigned to the telephony software application 400. As a result, the called party does not see either of those identifiers in the caller ID information presented to the called party. Instead, the originating identifier can be left blank, or the originating identifier could be the proxy identifier that has been assigned. In some embodiments, the name of the user requesting the setup of the telephony communication could be included in the caller ID information presented to the called party, which may encourage the called party to accept the incoming telephony communication setup request. In other instances, even the name of the party requesting setup of the confidential telephony communication may be withheld.

If the name of the calling party that is requesting the setup of the confidential telephony communication is to be presented to the called party, the name may be included with the call setup request that the proxy telephony communication setup unit 210/350 receives from the telephony software application 400. In other instances, the name may be included in the original proxy request, and the name may then be passed along to the proxy telephony communication setup unit 210/350 in the proxy notification communication.

Once the telephony communication has been setup between the telephony software application 400 on the calling party's telephony device and the called party's telephony device, the methods depicted in FIGS. 6 and 8 end.

A user may configure their telephony device to follow the above-discussed telephony communication setup procedures for all outgoing telephony communications. Alternatively, the user may configure their telephony device to follow these procedures on a case-by-case basis when the user believes it would be advantageous shield their telephony device identifier from the called party. This could be accomplished by providing the user with the ability to configure the software application 400 to setup all telephony communications as confidential telephony communications. Alternatively, the user may be able to modify a setting of the telephony software application on a call-by-call basis to request the setup of a confidential telephony communication.

The telephony software application 400 is then responsible for interacting with the operating system of the user's telephony device to instruct the operating system to divert all or some telephony communication setup requests made via the telephony device's native dialer or via a separate software application to the telephony software application 400 itself. This allows the diverted telephony communication unit 406 to thereafter control the actions that occur in connection with the requested telephony communication.

In some embodiments, the user may also be provided with the capability to configure the telephony software application 400 to request that various other actions occur when the telephony software application receives a diverted telephony communication setup request. These other actions can include connecting the user to a virtual assistant, recording the telephony communication, generating a transcription of a recorded telephony communication, engaging the services of a sentiment analysis unit 218 or the services of a call reporting unit 220, as well as other actions.

In other embodiments, it may be desirable to prevent the user from controlling the actions that occur when the telephony software application receives a diverted telephony communication setup request. Under those circumstances, the telephony communication API 212 of the telephony services provider may control the actions that occur when the diverted telephony communication unit 406 sends a diverted call setup request to the telephony communication API 212. This would allow management personnel to interact with the telephony service provider 160 to setup and control the actions that occur when the telephony software application 400 sends a diverted telephony communication setup request to the telephony communication API 212.

The invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
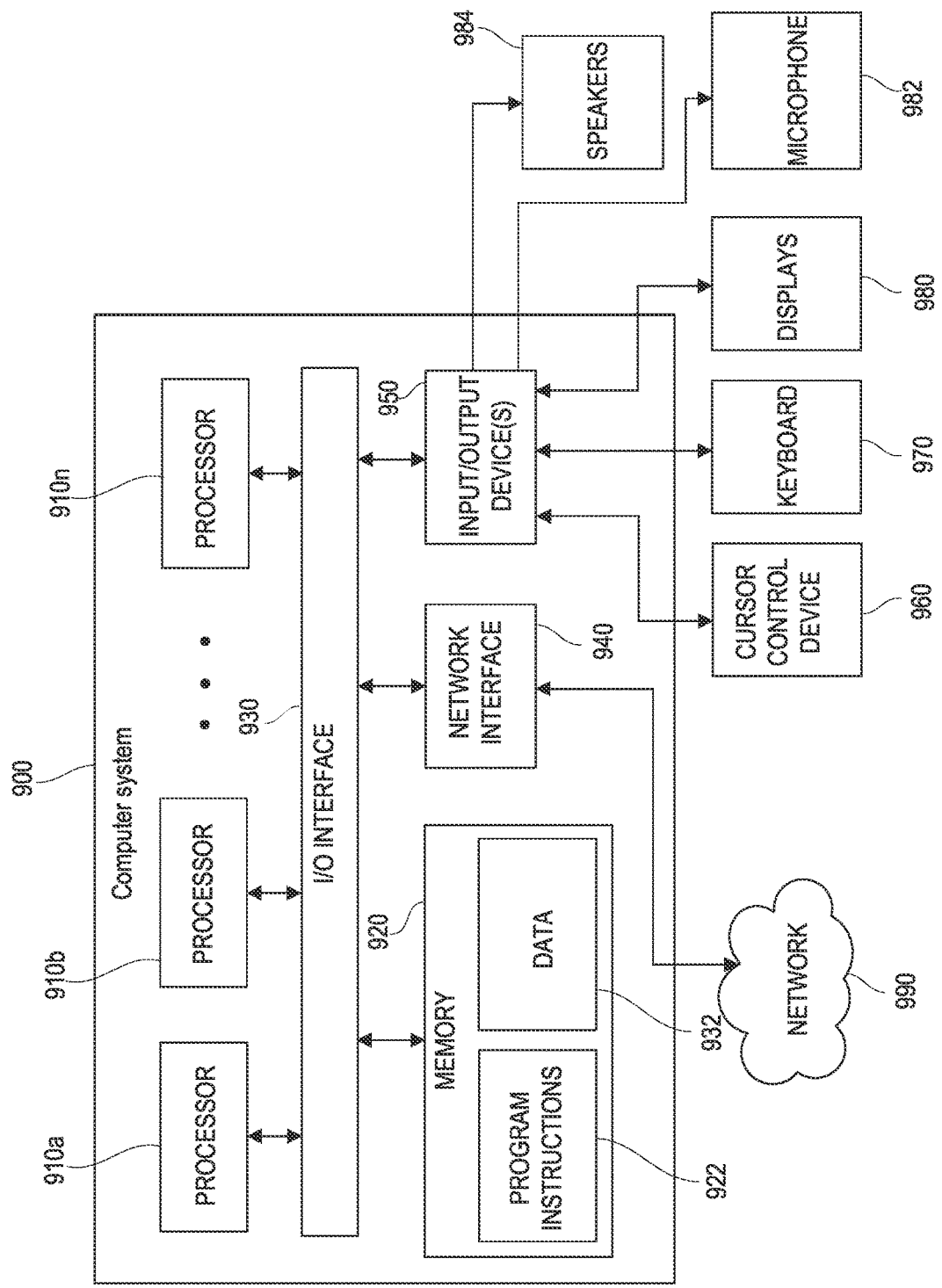
FIG. 9 is a diagram of a computer system and associated peripherals which could embody the invention, or which could be used to practice methods embodying the invention.

FIG. 9 depicts a computer system 900 that can be utilized in various embodiments of the present invention to implement the invention according to one or more embodiments. The various embodiments as described herein may be executed on one or more computer systems, which may interact with various other devices. One such computer system is the computer system 900 illustrated in FIG. 9. The computer system 900 may be configured to implement the methods described above. The computer system 900 may be used to implement any other system, device, element, functionality or method of the above-described embodiments. In the illustrated embodiments, the computer system 900 may be configured to implement the disclosed methods as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, an input/output devices interface 950. The input/output devices interface 950 facilitates connection of external I/O devices to the system 900, such as cursor control device 960, keyboard 970, display(s) 980, microphone 982 and speakers 984. In various embodiments, any of the components may be utilized by the system to receive user input described above. In various embodiments, a user interface may be generated and displayed on display 980. In some cases, it is contemplated that embodiments may be implemented using a single instance of computer system 800, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement a computer system 900 in a distributed manner.

In different embodiments, the computer system 900 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices interface 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

External input/output devices interface 950 may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900, In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of setting up proxy identifiers for telephony communications, comprising:
   receiving from a telephony software application on user's telephony device via a data network a first proxy request communication, the first proxy request communication indicating that a user of the telephony device would like to setup a telephony communication to a first called party, the first proxy request communication including a first called party identifier and a calling party identifier that is associated with the user's telephony device;
   identifying a first proxy identifier that will be used to help establish a telephony communication between the user's telephony device and a first telephony device associated with the first called party;
   sending a proxy identification communication to the user's telephony device, the proxy identification communication including the first proxy identifier; and
   causing a record in a proxy identifier database to be created or updated such that the record includes the calling party identifier, the first proxy identifier and the first called party identifier.

2. The method of claim 1, further comprising sending a first proxy notification communication to an element of a telephony service provider, the first proxy notification communication including the first called party identifier, the calling party identifier and the first proxy identifier.

3. The method of claim 1, wherein the calling party identifier is an identifier associated with the telephony software application on the user's telephony device.

4. The method of claim 1, wherein identifying a proxy identifier comprises identifying a proxy identifier that is associated with a different geographical location than the calling party identifier.

5. The method of claim 1, wherein the telephony software application on the user's telephony device sent the proxy request communication because an operating system of the user's telephony device diverted to the telephony software application a call setup request that was originally generated by a native dialer of the user's telephony device or by a second telephony software application on the user's telephony device.

6. The method of claim 1, further comprising:
receiving from the telephony software application on user's telephony device via a data network a second proxy request communication, the second proxy request communication indicating that the user would like to setup a telephony communication to a second called party, the second proxy request communication including a second called party identifier and the calling party identifier that is associated with the user's telephony device;
sending a proxy identification communication to the user's telephony device, the proxy identification communication including the first proxy identifier; and
causing a record in the proxy identifier database that is associated with the calling party identifier to be updated such that the record includes the calling party identifier, the first proxy identifier and the second called party identifier.

7. The method of claim 6, further comprising sending a second proxy notification communication to an element of a telephony service provider, the second proxy notification communication including the second called party identifier and at least one of the calling party identifier and the first proxy identifier.

8. The method of claim 1, further comprising:
receiving from the telephony software application on user's telephony device via a data network a second proxy request communication, the second proxy request communication indicating that the user would like to setup a telephony communication to a second called party, the second proxy request communication including a second called party identifier and the calling party identifier that is associated with the user's telephony device;
identifying a second proxy identifier that will be used to help establish a telephony communication between the user's telephony device and a telephony device associated with the second called party;
sending a proxy identification communication to the user's telephony device, the proxy identification communication including a second proxy identifier; and
causing a record in the proxy identifier database that is associated with the calling party identifier to be updated such that the record includes the calling party identifier, the second proxy identifier and the second called party identifier.

9. The method of claim 8, further comprising sending a second proxy notification communication to an element of a telephony service provider, the second proxy notification communication including the second called party identifier and the second proxy identifier.

10. A method of setting up a telephony communication performed by elements of a telephony services provider, comprising:

receiving a first telephony communication setup request from a telephony software application on a user's telephony device, wherein the first telephony communication setup request includes a first calling party identifier as the originating identifier and a first called party identifier as the destination identifier, wherein the received first telephony communication setup request was sent by the telephony software application on the user's telephony device because an operating system of the user's telephony device diverted to the telephony software application a call setup request that was originally generated by a native dialer of the user's telephony device or by a second telephony software application on the user's telephony device;
determining that the first called party identifier is a proxy identifier;
obtaining from a proxy identifier database a second called party identifier that is associated with a party the user is attempting to reach, wherein the second called party identifier is obtained from the proxy identifier database using the first calling party identifier and the first called party identifier; and
establishing a telephony communication between telephony software application and a telephony device associated with the second called party identifier by sending a telephony communication setup request that includes the second called party identifier as the destination identifier.

11. The method of claim 10, wherein the second telephony communication setup request includes an originating identifier that is associated with a geographical area that is different from a geographical area associated with the first calling party identifier.

12. The method of claim 10, wherein the second telephony communication setup request includes the first called party identifier as the originating identifier.

13. The method of claim 10, wherein the first calling party identifier is an identifier associated with the telephony software application on the user's telephony device.

14. The method of claim 10, wherein the first calling party identifier is an identifier associated with a native dialer of the user's telephony device.

15. The method of claim 10, wherein the telephony software application on the user's telephony device is a first telephony software application, and wherein the first calling party identifier is an identifier associated with a second telephony software application on the user's telephony device.

16. A method performed by a telephony services provider to setup a telephony communication, comprising:
receiving a proxy notification communication that includes a calling party identifier, a proxy identifier and a called party identifier;
receiving a first telephony communication setup request from a telephony software application on a user's telephony device, the first telephony communication setup request including the calling party identifier as the originating identifier and the proxy identifier as the destination identifier, wherein the received first telephony communication setup request was sent by the telephony software application on the user's telephony device because an operating system of the user's telephony device diverted to the telephony software application a call setup request that was originally generated by a native dialer of the user's telephony device or by a second telephony software application on the user's telephony device; and establishing a telephony communication between the telephony software application on the user's telephony device and a telephony device associated with the called party identifier by sending a second telephony communication setup request that includes the called party identifier as the destination identifier and that includes an originating identifier that is associated with a geographical area that is different from a geographical area associated with the calling party identifier.

17. The method of claim 16, wherein the calling party identifier is an identifier associated with the telephony software application on the user's telephony device.

18. The method of claim 16, wherein the calling party identifier is an identifier associated with a native dialer of the user's telephony device.

19. The method of claim 16, wherein the telephony software application on the user's telephony device is a first telephony software application, and wherein the calling party identifier is an identifier associated with a second telephony software application on the user's telephony device.

20. The method of claim 16, wherein the second telephony communication setup request includes the proxy identifier as the originating identifier.

* * * * *